United States Patent

[11] 3,618,893

| [72] | Inventor | Louis Bois<br>Sens, France |
|---|---|---|
| [21] | Appl. No. | 880,038 |
| [22] | Filed | Nov. 26, 1969 |
| [45] | Patented | Nov. 9, 1971 |
| [73] | | Assignee to Societe Technique et Commercial D'Installations Industrielles "Luceat", Sens, France |
| [32] | Priority | Dec. 20, 1968 |
| [33] | | France |
| [31] | | 179,511 |

[54] ANTIVIBRATION VALVE SEAT ASSEMBLY
10 Claims, 2 Drawing Figs.

[52] U.S. Cl. .................................................. 251/359,
137/516.27, 137/630.22, 251/172, 251/364
[51] Int. Cl. .............................................. F16k 1/44
[50] Field of Search............................................137/516.27,
630.14, 630.22; 251/172, 173, 359, 364, 333

[56] References Cited
UNITED STATES PATENTS
3,387,623  6/1968  Essig ............................. 137/516.27 X
FOREIGN PATENTS
953,216  12/1949  France ............................ 251/172

*Primary Examiner*—Robert G. Nilson
*Attorneys*—F. W. Anderson and C. E. Tripp

ABSTRACT: An antivibration seat assembly especially for a relief-type valve, comprising an annular body adapted for removable installation in the valve's flow passage, a resilient seat to establish a seal between the body and the valve's plate or closure member, and an auxiliary floating seat within a chamber surrounding the flow passage through the body. The floating seat moves axially to an extended position in response to a pressure differential between its end surfaces when the valve's closure member approaches the closed position, and during the final closing movement of the closure member, the floating seat remains in contact with it, eliminating undesirable vibrations.

PATENTED NOV 9 1971 3,618,893
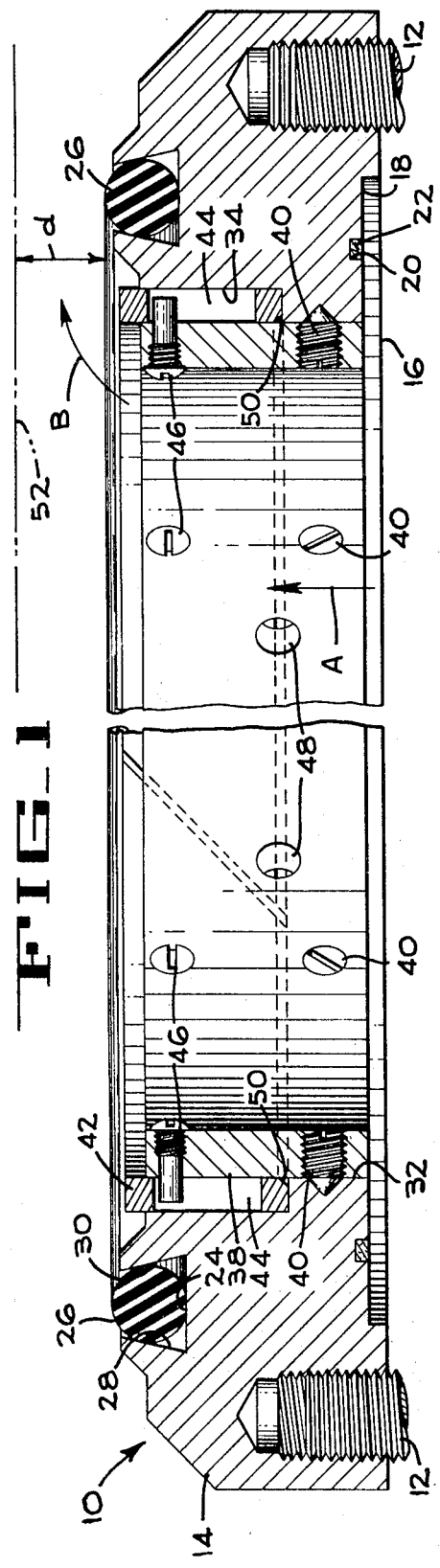
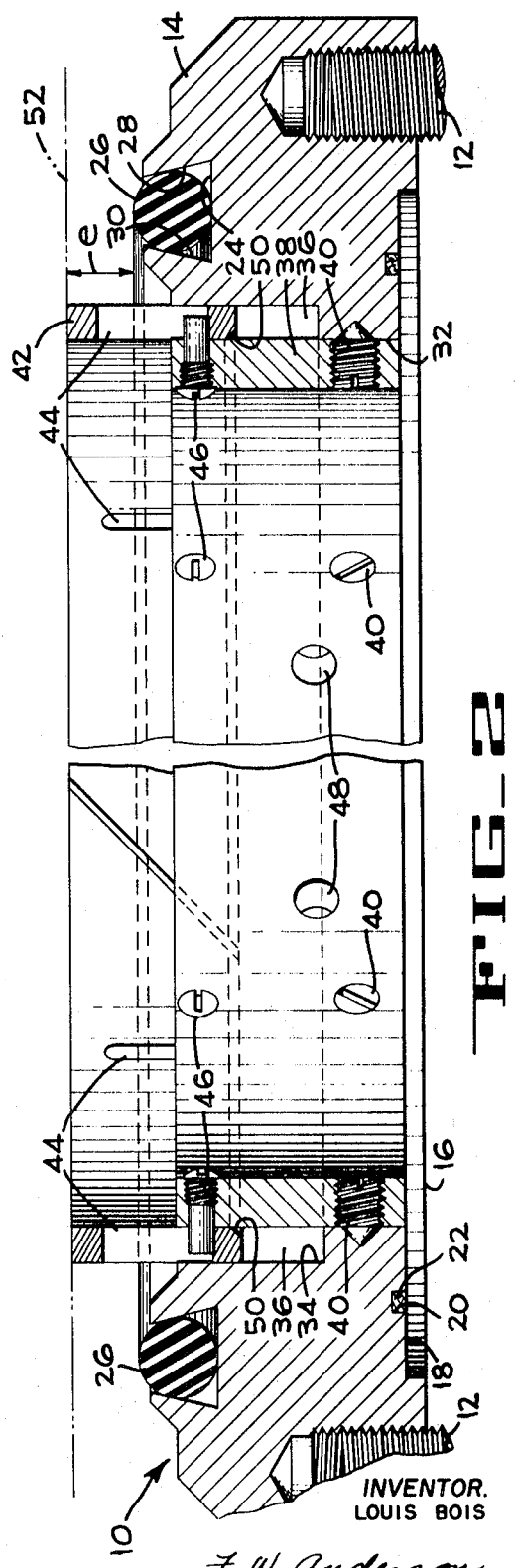
INVENTOR.
LOUIS BOIS
BY F. W. Anderson
C. E. Tripp
ATTORNEYS

ANTIVIBRATION VALVE SEAT ASSEMBLY

CROSS-REFERENCE TO RELATED APPLICATIONS

A valve in which this seat assembly can be used is disclosed in applicant's copending application Ser. No. 880,031, filed Nov. 26, 1969.

BACKGROUND OF THE INVENTION

Field of the Invention

The present invention concerns an improved seat assembly for a pressure relief valve of the type having a movable diaphragm and plate. In particular, a seat assembly including a stationary and a floating seat is described.

SUMMARY OF THE INVENTION

One particular problem encountered in the present diaphragm-type relief valves is a chattering or vibration of the valve closure plate against its seat during the final closing movement. These vibrations cause accelerated wear and damage to both the resilient seat and the flexible diaphragm.

The problem is eliminated in the present invention by providing a seat assembly with a floating annular seat slidably mounted for limited axial movement in a chamber in the body of the seat assembly, concentric with a conventional annular resilient stationary seat. During the final closing stage of the valve plate, the pressure exerted against the upstream end surface of the floating seat increases over that exerted against its downstream end surface, causing the seat to rapidly move axially in the direction of flow from its retracted to an extended position and engage the valve plate, substantially closing the valve and shutting of the vibration-causing flow. Thereafter, any oscillation of the valve plate caused by pressure transients is followed by the floating seat until the valve plate engages the stationary seat completely closing the valve.

An additional advantage obtained by the invention is a slower final closing motion by permitting a limited flow through the floating seat and thereby eliminating the large and abrupt closing forces and shock experienced by the stationary seat and the flexible diaphragm.

Further advantages will become apparent in the following drawings and description.

DESCRIPTION OF THE DRAWINGS

FIG. 1 is a view in diametrical cross section of the seat assembly with the floating seat in its retracted position.

FIG. 2 is a view similar to FIG. 1, but showing the floating seat in its extended position.

DESCRIPTION OF THE INVENTION

With reference to the drawings, this invention comprises an annular seat assembly 10 adapted for mounting on a terminal flange of a pipe or raised portion of a pressure vessel (not shown) by means of multiple bolts 12. The seat assembly includes a body 14 with an upstream end surface 16 containing an annular clearance surface 18. The clearance surface 18 has an annular groove 20 for receiving a packing 22 to provide a seal between the body 14 and the aforementioned flange.

The downstream end of the body 14 is provided with an annular groove 24 for receiving and retaining an elastic O-ring seat 26 of circular cross section. In order to retain the O-ring 26 as well as permit elastic deformation of the O-ring into the groove 24 when the valve closes against it, the groove is provided with convergently sloping sidewalls 28 and 30.

The body 14 has an upstream cylindrical bore 32, and a coaxial downstream cylindrical counterbore 34 of somewhat greater diameter. An annular chamber 36, best seen in FIG. 2, is created when a sleeve 38 is mounted within the bores 32, 34, and affixed to the surface of bore 32 by multiple setscrews 40. This chamber receives an annular floating seat 42 comprising a cylindrically shaped sleeve of slightly narrower width than the chamber 36 so the floating seat 42 may freely slide up and down therein. Such seat 42 may, for example, be formed from a circularily wound strip of suitable material preferably having a low coefficient of friction in relation with the body material and a low specific gravity to minimize its inertia during movement. Multiple vertically oriented slots 44 in the seat 42 are engaged by screw studs 46, which are threaded in and extend through the sleeve 38, so that the floating seat 42 is retained in the chamber while allowing limited vertical movement therein.

A series of ports 48 in the sleeve 38 communicate with the chamber 36 whereby the fluid or gas pressure at the inner surface of the sleeve is exerted beneath the floating seat 42. In order to more efficiently transmit this pressure around the bottom and periphery of the seat, the lower inner edge of the seat 42 is beveled as indicated at 50.

OPERATION

The seat assembly as seen in FIG. 1, corresponds to the retracted position of the floating seat when the relief valve is either in the fully open or closed position. Let us assume that the relief valve is in the fully open position and that a valve plate 52 (shown in phantom line in FIGS. 1 and 2) is a substantial distance $d$ (FIG. 1) above the O-ring 26. As the relief valves closes, the valve plate 52 lowers to a position spaced only a small distance $e$ above the O-ring 26 (FIG. 2). Consequently the velocity of the medium flowing out of the opening defined by the inner surface of sleeve 38, increases substantially as it flows radially outward over the O-ring 26 and edge of the seat assembly 10 and under the valve plate 52.

For example, the velocity in the vicinity of arrow A is substantially less than at arrow B, Then in accordance with Bernoulli's Law, the total pressure head remaining the same, the static pressure at B is less than at A due to the greater velocity at B. The greater static pressure at A is directed through the ports 48 and under side and beveled edge 50 of the floating seat. As a result, the floating seat is moved to and retained in the extended position of FIG. 2 where the top of the floating seat contacts the underside of the valve plate 52, shown in phantom line. The valve is now substantially closed except for continuing flow through the slots 44 and some leakage between the valve plate 52 and the top of the floating seat 42.

Continuing downward pressure on the valve plate 52 forces the floating seat downwardly until a complete seal is effected between the O-ring seat 26 and the valve plate. The previously annoying and destructive chattering and vibration caused by flow surges is now eliminated because the floating seat 42 permits limited upward and downward movement of the valve plate without disengagement in the range of movement of the floating seat.

Upon complete closure of the valve no pressure difference exists between points A and B and the floating seat returns to the fully retracted position of FIG. 1.

Although the best mode contemplate for carrying out the present invention has been herein shown and described, it will be apparent that modification and variation may be made without departing from what is regarded to be the subject matter of the invention.

What is claimed is:

1. An antivibration seat assembly for a valve comprising an annular body that surrounds a central flow passage, said body having a stationary annular resilient seat on its downstream side for engagement with a closure member, an annular chamber is said body disposed radially inwardly of said stationary seat and radially outwardly of said flow passage, said chamber being adapted to slidably receive an annular floating seat therein, an annular floating seat slidably disposed in said chamber, said floating seat having upstream and downstream ends and being adapted to slide axially in said chamber in a downstream direction in response to a greater fluid pressure at the upstream end than at the downstream end, means for retaining said floating seat in said chamber, and means for communicating fluid pressure from the flow passage into said chamber and against the upstream end of said floating seat.

2. The seat assembly of claim 1 wherein said annular floating seat includes at least one aperture permitting flow therethrough from said flow passage when said floating seat is in engagement with a valve closure member.

3. The seat assembly of claim 1 wherein said body has an annular seat mounting groove, said groove having convergently sloping sidewalls for retaining said stationary seat.

4. The seat assembly of claim 1 wherein said floating seat is comprised of a material having a low specific gravity and a low coefficient of friction with the surfaces of said chamber.

5. The seat assembly of claim 1 wherein said pressure communicating means includes means for providing improved pressure distribution around the periphery between the chamber and the base of the floating seat.

6. An antivibration seat assembly for a valve comprising an annular body having a central bore defining a flow passage, a stationary seat on the downstream side of the body that surrounds said bore, a counterbore of somewhat larger diameter than said central bore and concentric therewith, said counterbore being located downstream of said central bore, an annular sleeve rigidly mounted within said central bore defining a chamber between the sleeve and said counterbore and a flow passage interior of its inside surface, an annular floating seat slidably received in said chamber, means mounting said floating seat in said chamber for limited motion therein and means communicating pressure between said flow passage and beneath said floating seat in the chamber.

7. The seat assembly of claim 6 wherein said annular floating seat includes one aperture cooperating with said mounting means to limit the sliding movement of said seat, and said aperture permitting limited flow from said flow passage when said floating seat is in engagement with a valve closure member.

8. The seat assembly of claim 6 wherein said pressure communicating means includes means for providing improved pressure distribution around the periphery between the chamber and the base of the floating seat.

9. The seat assembly of claim 6 wherein said floating seat is comprised of a material having a low specific gravity and a low coefficient of friction with the surfaces of said chamber.

10. The seat assembly of claim 6 wherein said body has an annular seat mounting groove, said groove having convergently sloping sidewalls for retaining said stationary seat.

* * * * *